(12) United States Patent
Jin et al.

(10) Patent No.: US 12,349,167 B2
(45) Date of Patent: Jul. 1, 2025

(54) METHOD AND APPARATUS FOR PERFORMING COMMUNICATION IN WIRELESS COMMUNICATION SYSTEM

(71) Applicant: Samsung Electronics Co., Ltd., Gyeonggi-do (KR)

(72) Inventors: Seungri Jin, Gyeonggi-do (KR); Himke Van Der Velde, Surrey (GB); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 142 days.

(21) Appl. No.: 17/766,385

(22) PCT Filed: Oct. 7, 2020

(86) PCT No.: PCT/KR2020/013676
§ 371 (c)(1),
(2) Date: Apr. 4, 2022

(87) PCT Pub. No.: WO2021/071253
PCT Pub. Date: Apr. 15, 2021

(65) Prior Publication Data
US 2024/0064786 A1 Feb. 22, 2024

(30) Foreign Application Priority Data
Oct. 7, 2019 (KR) .................. 10-2019-0123950

(51) Int. Cl.
*H04W 72/51* (2023.01)
(52) U.S. Cl.
CPC .................. *H04W 72/51* (2023.01)
(58) Field of Classification Search
CPC ..... H04W 72/51; H04W 88/06; H04W 76/15; H04W 8/24; H04W 24/10; H04W 72/0453; H04L 5/001; H04L 5/0092
See application file for complete search history.

(56) References Cited

U.S. PATENT DOCUMENTS

| 11,350,473 B2 | 5/2022 | Jin et al. |
| 2015/0124743 A1 | 5/2015 | Damnjanovic et al. |

(Continued)

FOREIGN PATENT DOCUMENTS

| JP | 2019-062507 | 4/2019 |
| JP | 2019-092046 | 6/2019 |

(Continued)

OTHER PUBLICATIONS

Google Inc., Qualcomm Inc., "Correction to sTTI and sPT Capability Reporting", R2-1911611, 3GPP TSG-RAN2 Meeting #107, Aug. 26-30, 2019, 65 pages.

(Continued)

*Primary Examiner* — Anh Ngoc M Nguyen
(74) *Attorney, Agent, or Firm* — The Farrell Law Firm, P.C.

(57) ABSTRACT

Provided is a method performed by a user equipment (UE) in a wireless communication system. The method includes: receiving, from a base station, a UE capability enquiry message associated with a limitation on a maximum number of transmission component carriers (CCs) of the UE; when a radio access technology (RAT) type of the received UE capability enquiry message indicates multi-radio dual connectivity (MR-DC) and the UE supports the MR-DC, determining UE capability information that the UE is to report, based on the received UE capability enquiry message; and transmitting the determined UE capability information to the base station.

14 Claims, 11 Drawing Sheets

(56) References Cited

U.S. PATENT DOCUMENTS

| | | | |
|---|---|---|---|
| 2019/0200406 A1* | 6/2019 | Henttonen | H04W 76/15 |
| 2019/0342873 A1 | 11/2019 | Kim et al. | |
| 2019/0342890 A1* | 11/2019 | Tong | H04W 76/27 |
| 2021/0211899 A1* | 7/2021 | Koziol | H04W 24/10 |

FOREIGN PATENT DOCUMENTS

| | | |
|---|---|---|
| KR | 1020140047504 | 4/2014 |
| KR | 1020160079838 | 7/2016 |
| KR | 1020200115863 | 10/2020 |

OTHER PUBLICATIONS

Korean Office Action dated Jun. 25, 2024 issued in counterpart application No. 10-2019-0123950, 4 pages.

Ericsson, "Relation of Feature Sets and Band Combinations", R2-1814979, 3GPP TSG-RAN WG2 #103bis, Oct. 8-12, 2018, 6 pages.

Nokia et al., "(Alternative 3) Summary of MR-DC Feature Sets and Band Combination Retrieval", R2-1817237, 3GPP TSG-RAN WG2 Meeting #104, Nov. 12-16, 2018, 7 pages.

Qualcomm Incorporated, "Clarification on channel Bandwidth Capabilities", R2-1906105, 3GPP TSG-RAN WG2 Meeting #106, May 13-17, 2019, 15 pages.

Samsung, "Additional UE Capability Filtering to Limit the Total Number of Carriers in NR", R2-1912517, 3GPP TSG-RAN WG2 Meeting #107bis, Oct. 14-18, 2019, 13 pages.

ZTE Corporation et al., "Clarification on the Applied FreqBandList Filter in UE-EUTRA-Capability_Option1", R2-1906259, 3GPP TSG-RAN WG2 Meeting #106, May 13-17, 2019, 60 pages.

International Search Report dated Dec. 30, 2020 issued in counterpart application No. PCT/KR2020/013676, 15 pages.

3GPP TS 38.331 V15.7.0, 3GPP, 3rd Generation Partnership Project; Technical Specification Group Radio Access Network; NR; Radio Resource Control (RRC) Protocol Specification (Release 15), Sep. 2019, 527 pages.

Korean Office Action dated Nov. 16, 2023 issued in counterpart application No. 10-2019-0123950, 6 pages.

ZTE Corporation, "Correlated UE Capability Report in EN-DC and MR-DC/5GC", R2-1802054, 3GPP TSG-RAN WG2 Meeting 101, Feb. 26-Mar. 2, 2018, 5 pages.

* cited by examiner

METHOD AND APPARATUS FOR PERFORMING COMMUNICATION IN WIRELESS COMMUNICATION SYSTEM

PRIORITY

This application is a National Phase Entry of PCT International Application No. PCT/KR2020/013676, which was filed on Oct. 7, 2020, and claims priority to Korean Patent Application No. 10-2019-0123950, which was filed on Oct. 7, 2019, the entire content of each of which is incorporated herein by reference.

TECHNICAL FIELD

The disclosure relates to a wireless communication system, and more particularly, to a method and apparatus for limiting the maximum number of transmission carriers in a method by which a user equipment (UE) reports its capability in a wireless communication system.

BACKGROUND ART

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why 5G communication systems or pre-5G communication systems are called beyond 4G network communication systems or post long-term evolution (LTE) systems. In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (COMP), and interference cancellation. Also, for 5G systems, other technologies have been developed, e.g., hybrid frequency-shift keying (FSK) and quadrature amplitude modulation (QAM) (FOAM) and sliding window superposition coding (SWSC), which are advanced coding modulation (ACM) schemes, and filter bank multi carrier (FBMC), non-orthogonal multiple access (NOMA), and sparse code multiple access (SOMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

DISCLOSURE

Technical Solution

In the disclosure, when a user equipment (UE) receives, from a base station, a radio resource control (RRC) UE capability enquiry message for reporting UE capability regarding a specific band and radio access technology (RAT) type, in a new radio (NR) system, UE capability is generated and reported based on filtering information included in the message. In the NR system, the maximum number of transmittable carriers may be limited for each band in a band combination. In other words, in the NR system, it is able to limit only the number of component carriers configuring the specific band, and it is unable to limit the entire maximum number of transmission carriers reported by the UE. In the disclosure, methods by which a base station limits the maximum number of transmission carriers supported by a UE and by which the UE transmits UE capability according to the limitation is considered.

Advantageous Effects

In the disclosure, when a new radio (NR) user equipment (UE) receives, from a base station, an enquiry message regarding a UE capability report, and receives filtering including a limitation or the like regarding the UE capability report, the UE capability report may be performed accordingly. In other words, the base station should be able to provide an accurate limitation and instruction to the UE, for example, the base station may limit and instruct the number of all carriers supported by the UE. In a current NR system, it is unable for the base station to identify the number of all carriers supported by the UE, but such a function may be supported through the disclosure. The base station may identify the number of all carriers supported by the UE, and thus the UE may reduce an unnecessary UE capability report, and the base station may receive only a necessary UE capability report that may be considered in a system.

BEST MODE

According to an embodiment of the disclosure, a method performed by a user equipment (UE) in a wireless communication system may include: receiving, from a base station, a UE capability enquiry message associated with a limitation on a maximum number of transmission component carriers (CCs) of the UE; when a radio access technology (RAT) type of the received UE capability enquiry message indicates multi-radio dual connectivity (MR-DC) and the UE supports the MR-DC, determining UE capability information that the UE is to report, based on the received UE capability enquiry message; and transmitting the determined UE capability information to the base station.

According to an embodiment of the disclosure, a user equipment (UE) in a wireless communication system includes: a transceiver; and at least one processor configured to: receive a UE capability enquiry message associated with a limitation on a maximum number of transmission component carriers (CCs) of the UE from a base station through the transceiver; when a radio access technology (RAT) type of the received UE capability enquiry message indicates multi-radio dual connectivity (MR-DC), and the UE supports the MR-DC, determine UE capability information that the UE is to report, based on the received UE capability enquiry message; and transmit the determined UE capability information to the base station through the transceiver.

MODE FOR INVENTION

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification. Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of descriptions, the disclosure uses terms and names defined by the $3^{rd}$ generation partnership project long term evolution (3GPP LTE) standard. However, the disclosure is not limited by such terms and names, and may be equally applied to systems conforming to other standards.

Figure 1A:
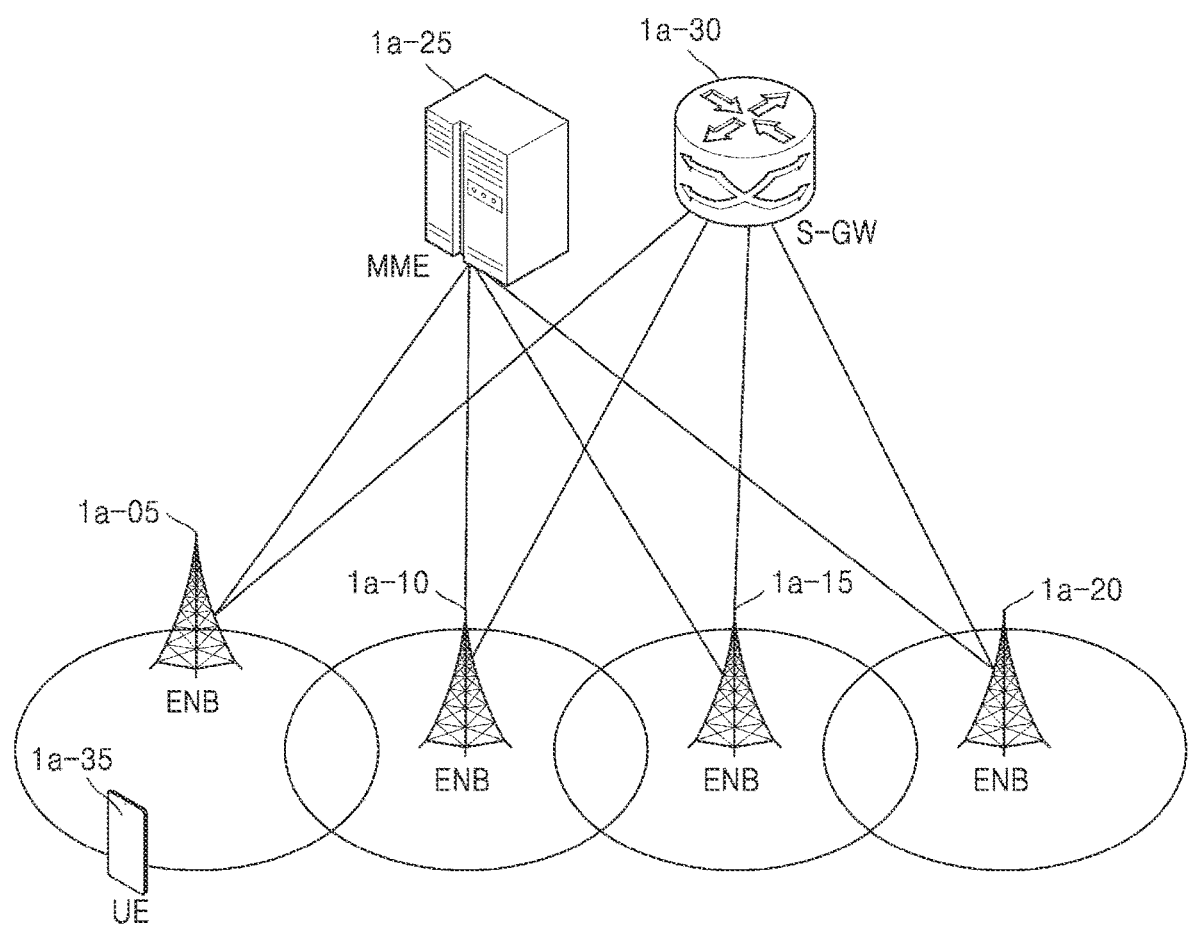
FIG. 1A is a diagram of a structure of a long-term evolution (LTE) system, which is referred to describe the disclosure.

FIG. 1A is a diagram of a structure of a long-term evolution (LTE) system, which is referred to describe the disclosure.

Referring to FIG. 1A, a radio access network of the LTE system may include evolved node Bs (eNBs) 1a-05, 1a-10, 1a-15, and 1a-20 (node Bs or base stations), a mobility management entity (MME) 1a-25, and a serving-gateway (S-GW) 1a-30. A user equipment (UE) 1a-35 (or a terminal) may access an external network via the eNB 1a-05, 1a-10, 1a-15, or 1a-20 and the S-GW 1a-30.

In FIG. 1A, each of the eNBs 1-05 through 1-20 may correspond to an existing node B of a universal mobile telecommunications system (UMTS). The eNB is connected to the UE 1a-35 through a radio channel and performs complex functions compared to the existing node B. Because all user traffic including real-time services such as voice over Internet protocol (VoIP) is serviced through shared channels in the LTE system, an entity for collating status information, such as buffer statuses of UEs, an available transmission power status, channel status, etc., and performing scheduling is required, and each of the eNBs 1a-05 through 1a-20 serves as such an entity. One eNB generally controls a plurality of cells. For example, the LTE system may use radio access technology such as orthogonal frequency division multiplexing (OFDM) at a bandwidth of 20 MHz to achieve a data rate of 100 Mbps. Also, an adaptive modulation and coding (AMC) scheme for determining a modulation scheme and a channel coding rate is applied in accordance with a channel status of the UE. The S-GW 1a-30 is an entity for providing data bearers and may generate or remove the data bearers according to control by the MME 1a-25. The MME is an entity for performing not only a mobility management function but also various control functions on the UE, and may be connected to a plurality of base stations.

Figure 1B:
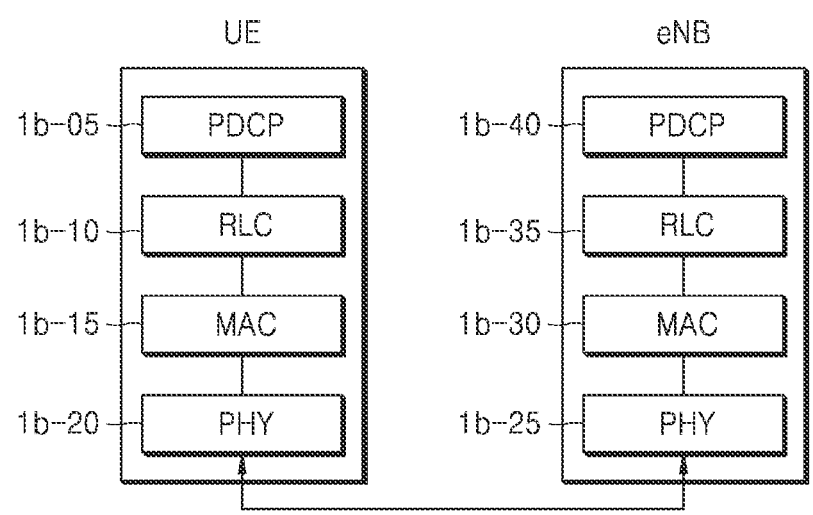
FIG. 1B is a diagram of a radio protocol architecture in an LTE system, which is referred to describe the disclosure.

FIG. 1B is a diagram of a radio protocol architecture in an LTE system, which is referred to describe the disclosure.

Referring to FIG. 1B, a radio protocol of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layers 1b-05 and 1b-40 may perform operations such as Internet protocol (IP) header compression reconstruction. Main functions of the PDCP layer are summarized as below.

Header compression and decompression: Robust header compression (ROHC) only

Transfer of user data

In-sequence delivery of upper layer packet data units (PDUs) at PDCP re-establishment procedure for RLC AM Reordering (for split bearers in dual connectivity (DC) (only support for RLC AM)): PDCP PDU routing for transmission and PDCP PDU rendering for reception Duplicate detection of lower Dyer SDUs at PDCP re-establishment procedure for RLC AM Retransmission of PDCP SDUs at handover and, for split bearers in DC, retransmission of PDCP PDUs at PDCP data-recovery procedure, for RLC AM Ciphering and deciphering Timer-based SDU discard in uplink The RLC layer 1b-10 or 1b-35 performs an automatic repeat request (ARQ) operation by reconfiguring PDCP PDUs to appropriate sizes. Main functions of the RLC layer are summarized as below.

Transfer of upper layer PDUs

Error correction through ARQ (only for AM data transfer)

Concatenation, segmentation, and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 is connected to multiple RLC layers configured for one UE, and may multiplex RLC PDUs into a MAC PDU and demultiplex the RLC PDUs from the MAC PDU. Main functions of the MAC layer are summarized as below.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid automatic request (HARQ)

Priority handling between logical channels of one UE

Priority handling between UEs by means of dynamic scheduling

Multimedia broadcast and multicast service (MBMS) identification

Transport format selection

Padding

PHY layer 1b-20 or 1b-25 may channel-code and modulate higher layer data into OFDM symbols and transmit the OFDM symbols through a radio channel, or demodulate OFDM symbols received through a radio channel and channel-decode and deliver the OFDM symbols to a higher layer. The PHY layer also uses HARQ for additional error correction, and a reception end transmits information about reception of a packet transmitted from a transmission end in one bit. This is referred to as HARQ acknowledgement (ACK)/non-acknowledgement (NACK) information. Downlink HARQ ACK/NACK information regarding uplink transmission may be transmitted via a physical HARQ indicator channel (PHICH), and uplink HARQ ACK/NACK information regarding downlink transmission may be transmitted via a physical uplink control channel (PUCCH) or a physical uplink shared channel (PUSCH).

The PHY layer may include one or a plurality of frequencies/carriers, and a technology for simultaneously configuring and using the plurality of frequencies is referred to as a carrier aggregation (CA) technology. According to the CA technology, a transmission amount may be dramatically increased by the number of subcarriers, by using a main carrier and one or a plurality of subcarriers instead of one carrier, for communication between a terminal (or a UE) and a base station (E-UTRAN node B or eNB). In LTE, a cell in the eNB using a main carrier is referred to as a primary cell (Pcell), and a cell in the eNB using a subcarrier is referred to as a secondary cell (Scell).

Although not illustrated, an RRC layer is present in higher layers of each of PDCP layers of the UE and the eNB, and may exchange access and measurement-related configuration control messages for RRC.

Figure 1C:
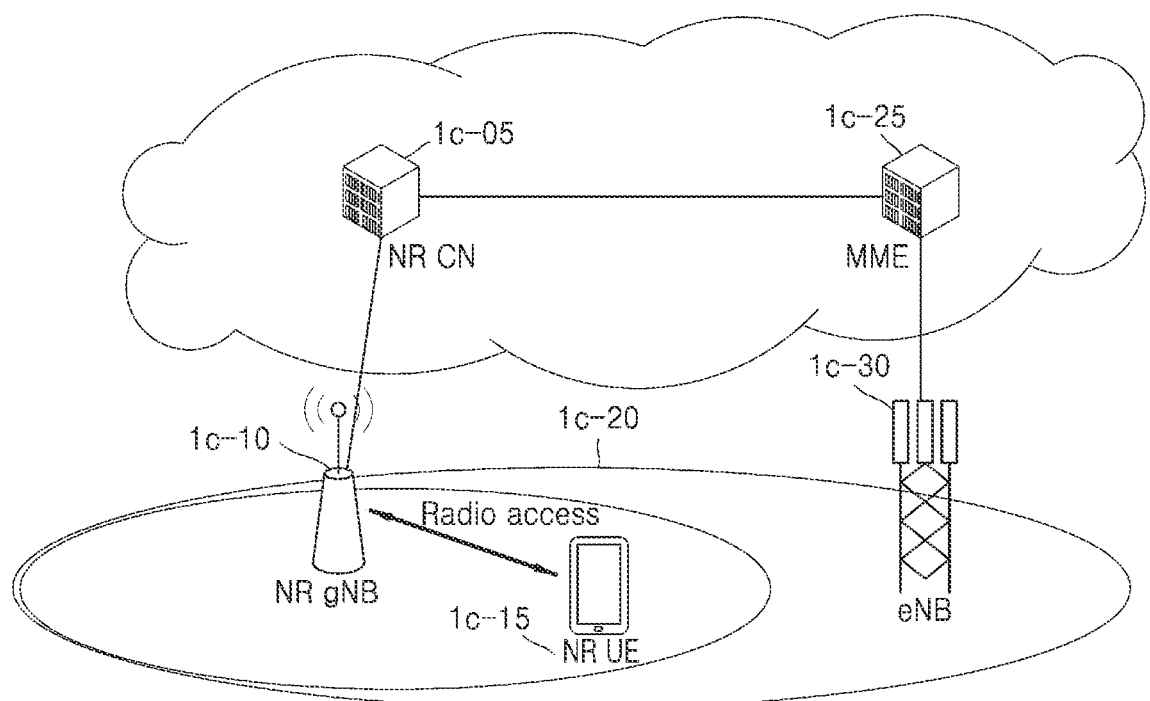
FIG. 1C is a diagram of a structure of a wireless communication system to which the disclosure is applied.

FIG. 1C is a diagram of a structure of a wireless communication system to which the disclosure is applied.

Referring to FIG. 1C, as illustrated, a radio access network of the wireless communication system may include an NR node B (NB) 1c-10 and an NR core network (CN) or next generation (NG) CN 1c-05. An NR UE or terminal 1c-15 may access an external network via the NR NB 1c-10 and the NR CN 1c-05.

In FIG. 1C, the NR NB 1c-10 may correspond to an eNB of an existing LTE system. The NR NB is connected to the NR UE 1c-15 through a radio channel and may provide a superior service compared to an existing NB. Because all user traffic is serviced through a shared channel in the wireless communication system, an entity for collating status information, such as buffer statuses of UEs, available transmission power statuses, channel statuses, etc. and performing scheduling is required, and such operations may be performed by the NR NB 1c-10. One NR NB may generally control a plurality of cells. The wireless communication system according to the disclosure may have a bandwidth greater than an existing maximum bandwidth to achieve an ultrahigh data rate compared to existing LTE, and may be additionally grafted onto a beamforming technology by using OFDM as a radio access technology. Also, the wireless communication system according to the disclosure may use an AMC scheme to determine a modulation scheme and a channel coding rate in accordance with a channel status of a UE, The NR CN 1c-05 may perform functions such as mobility support, bearer configuration, and quality of service (QoS) configuration. The NR CN 1c-05 is an entity for performing not only a mobility management function but also various control functions on the UE, and may be connected to a plurality of base stations. Also, the wireless communication system may cooperate with the existing LTE system, and the NR CN may be connected to an MME 1c-25 through a network interface. The MME may be connected to an eNB 1c-30 that is an existing base station.

Figure 1D:
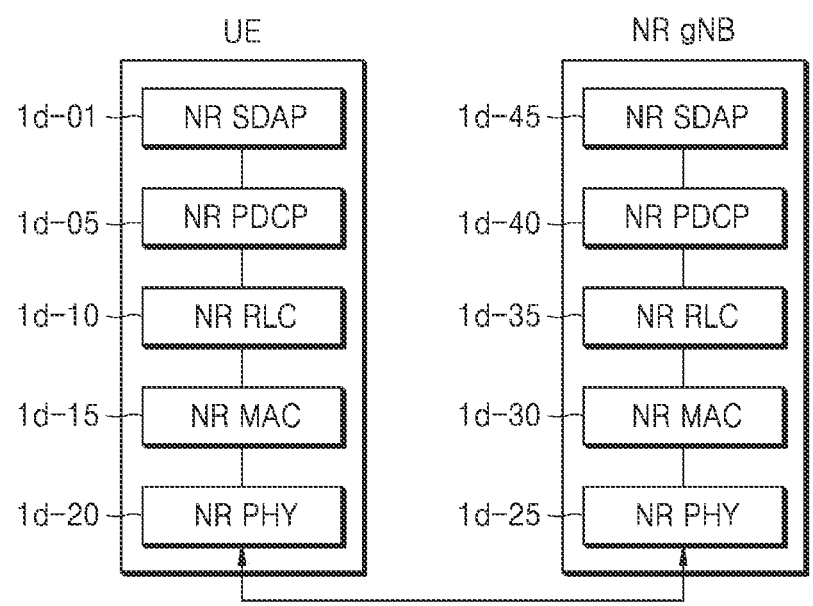
FIG. 1D is a diagram of a radio protocol architecture of a wireless communication system to which the disclosure is applicable.

FIG. 1D is a diagram of a radio protocol architecture of a wireless communication system to which the disclosure is applicable.

Referring to FIG. 1D, according to a radio protocol of the wireless communication system, a UE and an NR gNB may respectively include an NR SDAP 1d-01 and 1d-45, NR PDCP layers 1d-05 and 1d-40, NR RLC layers 1d-10 and 1d-35, and NR MAC layers 1d-15 and 1d-30.

Main functions of the NR SDAP layers 1d-01 and 1d-45 may include at least some of following functions.

Transfer of user plane data

Mapping between QoS flow and a data radio bearer (DRB) for both downlink (DL) and uplink (UL)

Marking QoS flow ID in both DL and UL packets

Reflective QoS flow to DRB mapping for the UL SOAP PDUs

Regarding the SDAP layer, the UE may be configured with, by an RRC message, whether to use a header of the SDAP layer or whether to use a function of the SDAP layer for each PDCP layer, for each bearer, or for each logical channel, and when an SDAP header is configured, a non-access stratum (NAS) reflective QoS configuration 1-bit indicator and access stratum (AS) reflective QoS configuration 1-bit indicator of the SDAP header may indicate the UE to update or reconfigure mapping information between a QoS flow and a data bearer for UL and DL. The SOAP header may include QoS flow ID indicating QoS. QoS information may be used as data processing priority information, scheduling information, or the like for supporting a smooth service.

Main functions of the NR PDCP layer 1$d$-05 or 1$d$-40 may include at least some of following functions.

Header compression and decompression; Robust header compression (ROHC) only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink Reordering of the NR PDCP layer may denote a function of reordering PDCP PDUs received from a lower layer, based on a PDCP sequence number (SN), and may include a function of delivering data to a higher layer in a reordered order. Alternatively, the reordering may include a function of immediately delivering the data without considering an order, a function of recording missing PDCP PDUs by reordering the order, a function of reporting a status regarding the missing PDCP PDUs to a transmitter, and a function of requesting to retransmit the missing PDCP PDUs.

Main functions of the NR RLC layer 1$d$-10 or 1$d$-35 may include at least some of following functions.

Transfer of upper layer PDUs
 In-sequence delivery of upper layer PDUs
 Out-of-sequence delivery of upper layer PDUs
 Error correction through ARC)
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment The in-sequence delivery of the NR RLC layer may denote a function of delivering RLC SDUs received from a lower layer, to a higher layer in order. The in-sequence delivery may include a function of reassembling RLC SDUs segmented from an RLC SDU and delivering the RLC SDUs when the segmented RLC SDUs are received, a function of reordering received RLC PDUs on an RLC SN or PDCP SN basis, a function of recording missing RLC PDUs by reordering the order, a function of reporting a status of the missing RLC PDUs to a transmitter, and a function of requesting to retransmit the missing RLC PDUs. The in-sequence delivery may include a function of delivering only RLC SDUs previous to a missing RLC SDU, to a higher layer in order, when the missing RLC SDU exists, a function of delivering all RLC SDUs received before a timer is started, to a higher layer in order, even when a missing RLC SDU exists, when a certain timer is expired, or a function of delivering all RLC SDUs currently received to the higher layer in order, when a certain timer is expired despite of a missing RLS SDU. Further, the NR RLC layer may process the RLC PDUs in order of reception (in order of arrival regardless of sequence numbers) and deliver the RLC PDUs to the PDCP layer out of order (out-of sequence delivery), and segments to be received or stored in a buffer may be reassembled into a whole RLC PDU, processed, and delivered to the PDCP layer. The NR RLC layer may not have the concatenation, and the concatenation may be performed by the NR MAC layer or be replaced with multiplexing of the NR MAC layer.

The out-of-sequence delivery of the NR RLC layer denotes a function of delivering RLC SDUs received from a lower layer immediately to a higher layer regardless of order, and may include a function of reassembling and delivering segmented and received RLC SDUs when one RLC SDU is segmented into several RLC SDUs, and a function of recording missing RLC PDUs by storing RLC SN or PDCP SN and reordering received RLC PDUs.

The NR MAC layer 1$d$-15 or 1$d$-30 may be connected to multiple NR RLC layers configured for a single UE, and main functions of the NR MAC layer may include at least some of following functions.

Mapping between logical channels and transport channels
 Multiplexing/demultiplexing of MAC SDUs
 Scheduling information reporting
 Error correction through HARQ
 Priority handling between logical channels of one UE
 Priority handling between UEs by means of dynamic scheduling
 Multimedia broadcast and multicast service (MBMS) identification
 Transport format selection
 Padding NR PHY layer 1$d$-20 or 1$d$-25 may channel-code and modulate higher layer data into OFDM symbols and transmit the OFDM symbols through a radio channel, or demodulate OFDM symbols received through a radio channel and channel-decode and deliver the OFDM symbols to a higher layer.

Figure 1E:
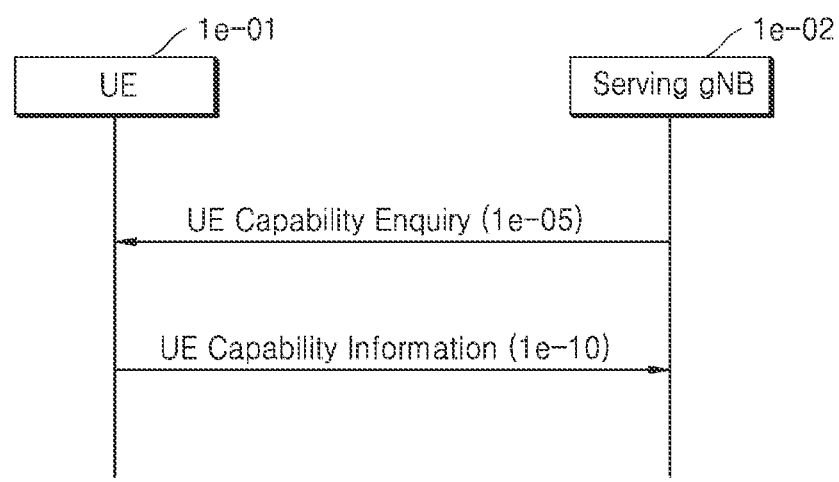
FIG. 1E is a diagram of a message structure of reporting user equipment (UE) capability in a new radio (NR) system.

FIG. 1E is a diagram of a message structure of reporting UE capability in an NR system.

Basically, a UE 1$e$-01 performs a procedure of reporting capability supported by a serving gNB 1$e$-02 while being connected to the serving gNB 1$e$-02. In operation 1$e$-05, the gNB may transmit, to the UE in a connected state, a UE capability enquiry message requesting a capability report. The capability enquiry message may include a UE capability enquiry for each RAT type of the gNB. The enquiry for each RAT type may include enquired frequency band information according to priority. Also, the UE capability enquiry message may enquire a plurality of RAT types via one RRC message container, or the UE capability enquiry message including an enquiry for each RAT type may be transmitted to the UE a plurality of times. In other words, a UE capability enquiry of operation 1$e$-05 may be repeated a plurality of times, and the UE may configure a corresponding UE capability information message, match a response to the enquiry, and report the same. In a next-generation mobile communication system, UE capability enquiry may be performed for MR-DC as well as NR, LTE, and EN-DC. For reference, the UE capability enquiry message is generally transmitted initially after the UE is connected, but may be enquired in any condition when required by the gNB.

Also, in operation 1$e$-05, the gNB may add, to the UE, filtering information for indicating a condition and limitation when generating the UE capability information message. Even when capability of the UE is high, it is meaningless to report the capability when the gNB is unable to process and support the capability, and thus UE capability that the UE is to report may be limited to receive only UE capability information required by the gNB. Accordingly, a size of the UE capability information message that the UE is to report may be reduced, and examples of the filtering may include the maximum number of CCs, the maximum number of MIMO layers, and a maximum bandwidth. A limitation on the filtering, in particular, the maximum number of supported CCs, is applied even in current LTE and NR, but application details are different between LTE and NR.

Filtering of Maximum Number of Carriers in LTE System
  A limitation on the maximum number of CCs of all UEs
  A limitation on the number of CCs in UL/DL via requestedMaxCCsDL-r13/requestedMaxCCsUL-r13
  A limitation on the number of CCs from 2 to 32
  A UE that has received a corresponding enquiry reports only UE capability smaller than requestedMaxCCsDL-r13/requestedMaxCCsUL-r13
  Report only when the number of corresponding bands/CCs does not exceed an indicated value in a supported band combination
  See ASN.1 defined in the RRC standard

| | | |
|---|---|---|
| UECapabilityEnquiry-v1310-IEs ::= | SEQUENCE { | |
|   requestReducedFormat-r13 | ENUMERATED {true} | OPTIONAL, -- Need ON |
|   requestSkipFallbackComb-r13 | ENUMERATED {true} | OPTIONAL, -- Need ON |
|   requestedMaxCCsDL-r13 | INTEGER (2..32) | OPTIONAL, -- Need ON |
|   requestedMaxCCsUL-r13 | INTEGER (2..32) | OPTIONAL, -- Need ON |
|   requestReducedIntNonContComb-r13 | ENUMERATED {true} | OPTIONAL, -- Need ON |
|   nonCriticalExtension | UECapabilityEnquiry-v1430-IEs | OPTIONAL |
| } | | |

1. Filtering of Maximum Number of Carriers in NR system
  Filtering information associated with the maximum number of CCs in an NR standalone mode is indicatable only for each band in a band combination (BC). In other words, only the number of CCs configuring a specific band may be limited.
  It is not possible to limit the entire maximum number of CCs supported by the UE.
  See ASN.1 defined in the RRC standard

| | | |
|---|---|---|
| UE-CapabilityRequestFilterNR ::= | SEQUENCE { | |
|   frequencyBandListFilter | FreqBandList | OPTIONAL, -- Need N |
|   nonCriticalExtension | UE-CapabilityRequestFilterNR-v1540 | OPTIONAL |
| } | | |
| FreqBandList ::= | SEQUENCE [SIZE (1..maxBandsMRDC)) OF FreqBandInformation | |
| FreqBandInformation ::= | CHOICE { | |
|   bandInformationEUTRA | FreqBandInformationEUTRA, | |
|   bandInformationNR | FreqBandInformationNR | |
| } | | |
| FreqBandInformationEUTRA ::= | SEQUENCE { | |
|   bandEUTRA | FreqBandIndicatorEUTRA, | |
|   ca-BandwidthclassDL-EUTRA | CA-BandwidthClassEUTRA | OPTIONAL, -- Need N |
|   ca-BandwidthClassUL-EUTRA | CA-BandwidthClassEUTRA | OPTIONAL -- Need N |
| } | | |
| FreqBandInformationNR ::= | SEQUENCE { | |
|   bandNR | FreqBandIndicatorNR, | |
|   maxBandwidthRequestedDL | AggregatedBandwidth | OPTIONAL, -- Need N |
|   maxBandwidthRequestedUL | AggregatedBandwidth | OPTIONAL, -- Need N |
|   maxCarriersRequestedDL | INTEGER (1..maxNrofServingCells) | OPTIONAL, -- Need N |
|   maxCarriersRequestedUL | INTEGER (1..maxNrofServingCells) | OPTIONAL -- Need N |
| } | | |

Examples of an actual application case regarding NR are as follows.

Figure 1F:
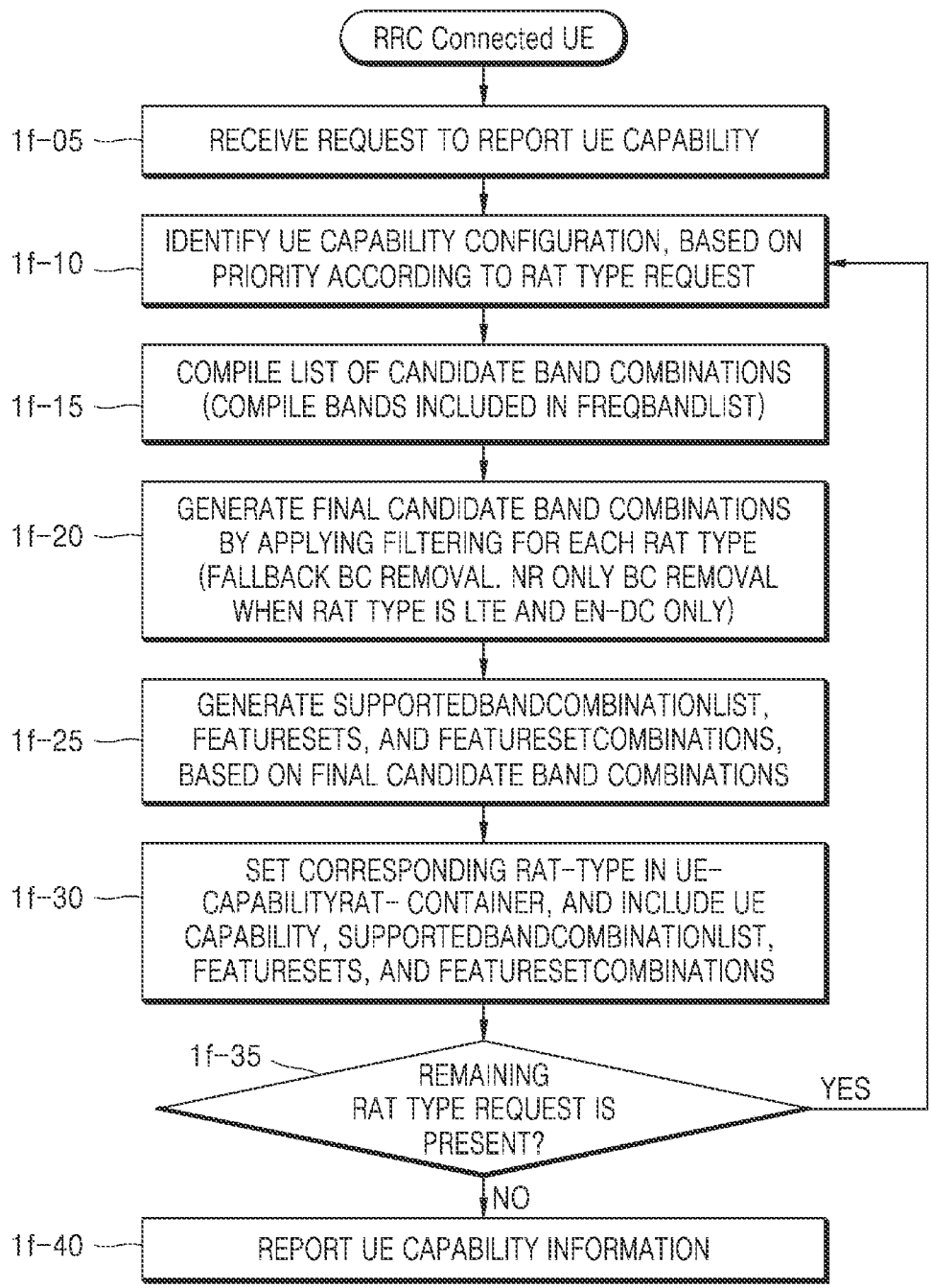
FIG. 1F is a diagram for describing operations of a UE for a UE capability report when a plurality of radio access technology (RAT) types, defined in a current NR system, are requested via one UECapabilityEnquiry, the operations being applied to a first embodiment of the disclosure.
Figure 1G:
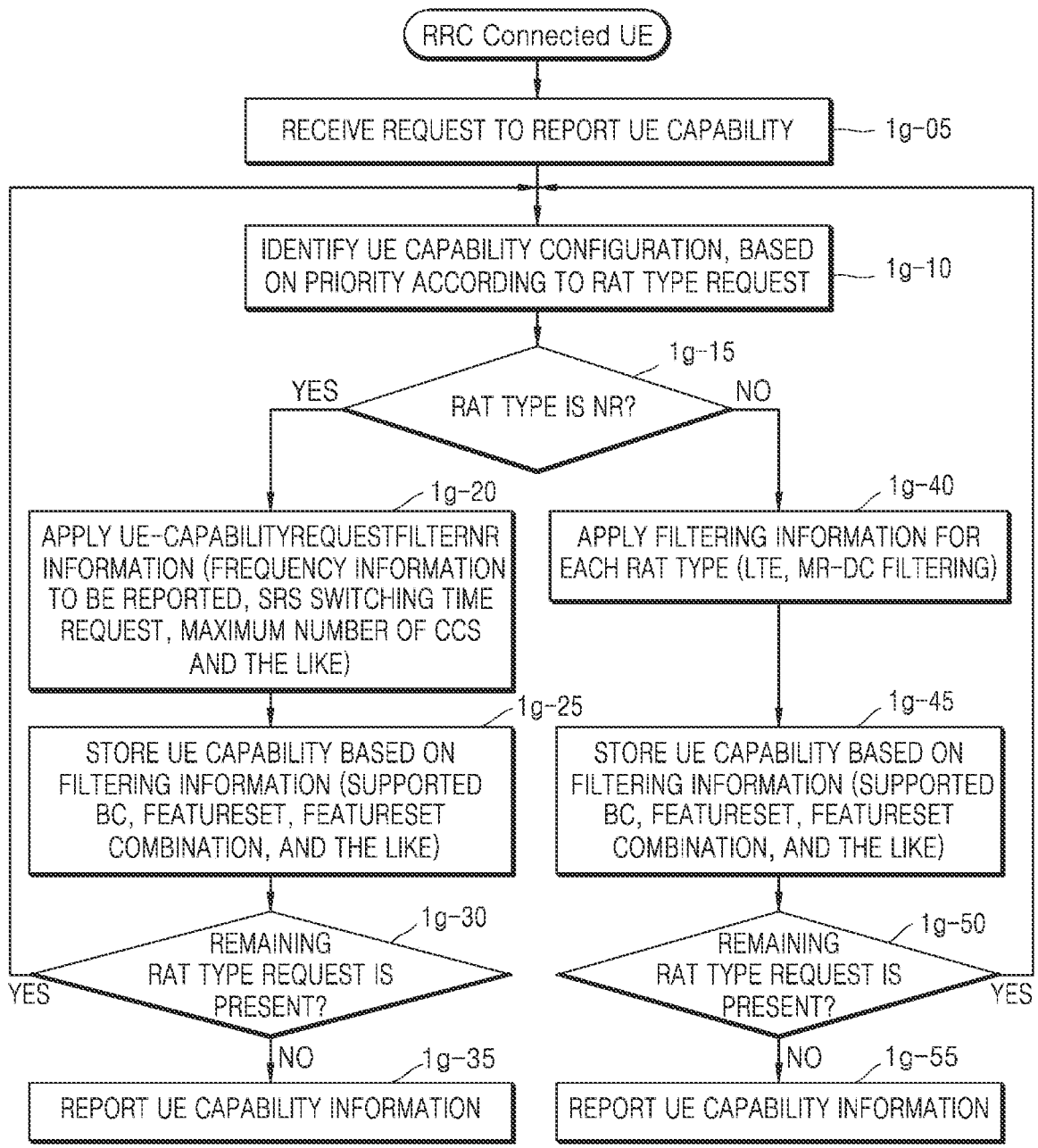
FIG. 1G is a diagram of a method of limiting the maximum number of carriers for each UE in NR standalone (SA) proposed in the disclosure, as the first embodiment of the disclosure.

Example 1: When bands A, B, C, and D are present, a CC limitation on each band may be as follows.
  Band A: Up to 3 CCs are possible
  Band B: Up to 2 CCs are possible
  Band C: Up to 4 CCs are possible
  Band D: Up to 2 CCs are possible In the above example, a CC limitation is variously applied depending on how bands are combined. In other words, the number of reported CCs varies depending on a BC in terms of an actual UE, despite a base station having indicated a CC limitation for each band. That is, a desired limitation is not properly applied.
  BC #1: For A, B, C, and D, up to 11 CCs are supported
  BC #2: For A, B, and C, up to 9 CCs are supported
  BC #3: For A, B, and D, up to 8 CCs are supported
  BC #4: For A and B, up to 5 CCs are supported Example 2: When the number of CCs transmittable from a UE is limited, e.g., maxRequestedCCs=8
  UE capability is reported considering maxRequestedCCs and UE capability of each band
  Number of supported BCs is reduced FIG. 1F is a diagram for describing operations of a UE for a UE capability report when a plurality of RAT types, defined in a current NR system, are requested via one UECapabilityEnquiry. In the current embodiment, the operations described in FIG. 1E, in particular, how a UE generates UE capability according to an RAT type request and a frequency band request, will be described in detail.

The UE in an RRC-connected state may be receive, from a base station, a request to report UE capability, in operation 1f-05. In operation 1f-05, the UE may receive a plurality of UE-CapabilityRAT-Request in UECapabilityEnquiry or may receive a request to report one RAT type. When the plurality of UE-CapabilityRAT-Request are received in UECapabilityEnquiry in operation 1f-05, the UE configures UE capability, based on a priority according to an RAT type request, in operation 1f-10. In NR, UE-CapabilityRAT-Containers are configured based on a priority below.
  ue-CapabilityRAT-Container for nr;
  ue-CapabilityRAT-Container for eutra-nr; and
  ue-CapabilityRAT-Container for eutra.

An eutra-nr container includes EN-DC, but may include NGEN-DC or NE-DC that is a late drop issue later. For reference, NR-DC may be included in an nr container to be transmitted.

According to the request to report UE capability regarding a specific RAT type in operation 1f-10, the UE may first configure (compile) candidate band combinations according to frequency filtering (FreqBandList) information included in an RAT type container, in operation 1f-15. In other words, operation 1f-15 and following UE operations may be performed with respect to the specific RAT type. For reference, the FreqBandList information has consistency when RAT type of EN-DC, NR SA, and LTE is requested together, meaning that the same procedure is repeated for each RAT type when a corresponding procedure is performed for each RAT type. In operation 1f-20, the UE may perform filtering on the obtained candidate band combinations for each RAT type, and generate final candidate band combinations applied to a corresponding RAT type.
  When an "eutra-nr-only" flag or an "eutra" flag is set, BCs regarding NR SA BCs may be completely removed from the configured candidate list of BCs. Such an operation may be performed only when an LTE base station (eNB) requests "eutra" capability.
  Then, the UE may remove fallback BCs from the configured candidate list of BCs. Here, the fallback BC corresponds to a case in which a band corresponding to at least one SCell is removed from any super set BC, and because the super set BC is able to already cover the fallback BC, the fallback BC may be omitted. This operation is also applied to EN-DC, i.e., to LTE bands. The remaining BCs are a final "candidate BC list".
  When capabilityRequestFilterCommon filtering is included, a corresponding configuration is applied.

In operation 1f-25, the UE may select BCs to be reported by selecting, from the final "candidate BC list", the BCs according to a requested RAT type. Here, the UE may configure supportedBandCombinationList in a determined order. Also, the UE may configure featureSetCombination regarding the supportedBandCombinationList generated in the above procedure, and configure a list of "candidate feature set combinations" from the candidate list of BCs from which a list of fallback BCs (including capability of a same or lower level) is removed. The "candidate feature set combination" includes all feature set combinations regarding NR and EUTRA-NR BCs, and may be obtained from feature set combinations of UE-NR-Capabilities and UE-MRDC-Capabilities containers. The procedure of generating the featureset is only performed for the nr and eutra RAT types, and is not performed for the eutra-nr RAT type. This is because a featureset for an NR part of EN-DC is transmitted to an NR container, and a featureset for an LTE part of EN-DC is transmitted to an LTE container, and thus redundant signaling is not required. Also, in the above description, only an nr RAT type has been described, but a procedure of generating a candidate featureset combination and the featureset of the LTE part of EN-DC may be performed for an LTE RAT type.

In operation 1f-30, when the requested RAT type is eutra-nr and affects supportedBandCombination of EN-DC, the UE may also include all featureSetCombinations to two UE-MRDC-Capabilities and UE-NR-Capabilities containers. However, a feature set of NR may only include UE-NR-Capabilities.

In operation 1f-35, the UE may identify whether there is a remaining RAT type in UE-CapabilityRAT-Request of the base station requested as UECapabilityEnquiry, and when there is an RAT type that has a lower priority than the previous RAT type but has not processed, the UE may perform a procedure regarding the corresponding RAT type from operation 1f-15. When there is no RAT type remaining in UE-CapabilityRAT-Request in operation 1f-35, the UE may transmit, to the base station, a UE capability message (information) included for each RAT type.

In a following embodiment, a method of applying filtering on the maximum number of CCs for each UE not supported in a current NR system, NR SA, and MR-DC (EN-DC, NR-DC, or NE-DC) will be described. Basically, it is required to additionally mount a corresponding function while maintaining existing parameter signaling and a UE capability operation. This is because a supported general rule needs to be applied when only a new function is implemented without difficulty in an existing operation. Also, the corresponding function is proposed and concretized by referring to a different filtering request structure of NR SA and MR-DC during a UE capability enquiry and report procedure.

FIG. G is a diagram of a method of limiting the maximum number of carriers for each UE in NR standalone (SA) proposed in the disclosure, as a first embodiment of the disclosure.

As described above, filtering information associated with the maximum number of CCs in an NR SA mode is indicatable only for each band in a BC. In other words, only the number of CCs configuring a specific band may be limited, and it is not possible to limit the entire maximum number of CCs supported by the UE. In the first embodiment, a parameter for limiting the maximum number of carriers for each UE is added, as the filtering information, to may include frequency information to be reported, an SRS switching time request, and the maximum number of carriers. The maximum number of carriers included in the filtering information for NR SA may be used as a parameter (maxCarriersRequestedDL, maxCarriersRequestedUL) for limiting the total number of carriers separately set for an uplink regarding a case where the UE operates in NR SA.

```
UE-CapabilityRequestFilterNR ::=      SEQUENCE {
    frequencyBandListFilter                FreqBandList
OPTIONAL,         -- Need N
    nonCriticalExtension                   UE-CapabilityRequestFilterNR-v1540    OPTIONAL
}
UE-CapabilityRequestFilterNR-v1540 ::= SEQUENCE {
    srs-SwitchingTimeRequest               ENUMERATED {true}
OPTIONAL,         -- Need N
    nonCriticalExtension                   SEQUENCE{ }                            OPTIONAL
}
UE-CapabilityRequestFilterNR-v15x0 ::=     SEQUENCE {
maxCarriersRequestedDL         INTEGER (1..maxNrofServingCells)     OPTIONAL, -- Need N
    maxCarriersRequestedUL     INTEGER (1..maxNrofServingCells)     OPTIONAL --
Need N
nonCriticalExtension                       SEQUENCE { }                           OPTIONAL
}
``` a UECapabilityEnquiry message requesting the UE for UE capability by a base station in the NR SA, and thus the total of CCs regarding BC and CA to be reported by the UE may not exceed the requested maximum number of CCs for each UE. In other words, when an RAT type in the UECapabilityEnquiry message is indicated in NR, the maximum number of carriers for each UE applied for NR SA may be limited by applying UE-CapabilityRequestFilterNR.

In operation 1g-05, the UE in an RRC-connected state may receive, from the base station, a UE capability enquiry message requesting a UE capability report. The message may include a UE capability enquiry for each RAT type by the base station. The enquiry for each RAT type may include frequency band information and filtering information. The filtering information may be configured to be dependent on the RAT type (for example, filtering regarding the NR SA mode), and transmitted to be commonly applied to all RATS (for example, common filtering regarding MR-DC). Also, the UE capability enquiry message may enquire a plurality of RAT types via one RRC message container, or the UE capability enquiry message including an enquiry for each RAT type may be transmitted to the UE a plurality of times. The UE capability enquiry may be repeated a plurality of times, and the UE may configure a corresponding UE capability information message, match a response to the enquiry, and report the same. In a wireless communication system, UE capability enquiry may be performed for MR-DC as well as NR, LTE, and EN-DC. For reference, the UE capability enquiry message is generally transmitted initially after the UE is connected, but may be enquired in any condition when required by the base station. Upon receiving the UE capability report request from the base station in operation 1g-05, the UE may identify a UE capability configuration to be reported according to band information and RAT type requested by the base station, in operation 1g-10.

When the RAT type requested by the base station is NR SA in operation 1g-15, the UE may apply filtering information (UE-CapabilityRequestFilterNR) regarding the received NR SA and FreqBandList included in each RAT type of the UE capability enquiry message requested by the base station, in operation 1g-20. The filtering information In operation 1g-25, the UE may generate a candidate band combination by using the filtering applied in operation 1g-20, and generate supportedBandCombinationList, featureSetCombinations, and featureSets dedicated to RAT. For reference, operation 1g-25 may be performed in an NR container, and featureSets may not be generated in an MR-DC container. This is because featureSet for MR-DC is generated in NR and LTE containers. The generated information may be set to the corresponding RAT type and included in a UE capability container. In operation 1g-30, the UE may identify whether there is an RAT type remaining without being processed yet, and when there is the remaining RAT type, return to operation 1a-10 and repeat the procedure for each RAT type. However, when there is no RAT type remaining without being processed and the UE capability procedure has been performed for all RAT types, the UE may transmit, to the base station, UE capability information included in the UE capability container for each RAT type, in operation 1g-35.

When the RAT type received by the UE is not NR in operation 1g-15, the UE may generate the candidate band combination by applying the received filtering information and FreqBandList included in the RAT type of the UE capability enquiry message requested by the base station, in operation 1g-40. Here, all candidate band combinations supporting NR SA and MR-DC are selected. In operation 1g-45, the UE may perform a filtering operation on a corresponding RAT type from among the candidate band combinations generated (or generated and stored) in operation 1g-40, generate a band combination supported by the corresponding RAT type, feature sets, and feature set combinations, set generated UE capability information in the corresponding RAT type, and include the same in the UE capability container. Also, in operation 1g-50, the UE may identify whether there is an RAT type remaining without being processed yet, and when there is the remaining RAT type, return to operation 1g-10 and repeat the procedure for each RAT type. However, when there is no RAT type remaining without being processed and the UE capability procedure has been performed for all RAT types, the UE may transmit, to the base station, the UE capability information included in the UE capability container for each RAT type, in operation 1g-55.

Figure 1H:
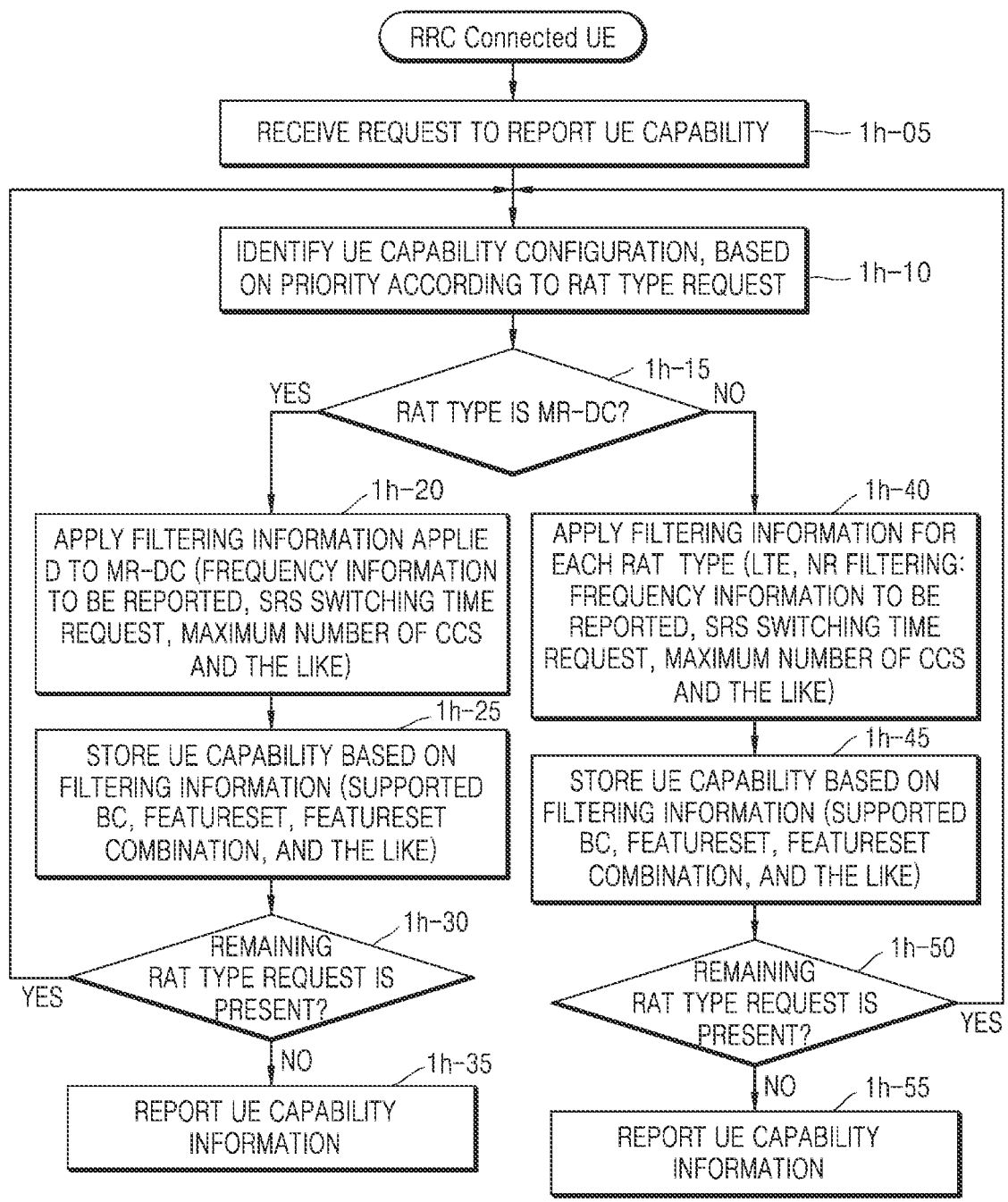
FIG. 1H is a diagram of a method of limiting the maximum number of carriers for each UE in mufti-radio dual connectivity (MR-DC) proposed in the disclosure, as a second embodiment of the disclosure.

FIG. 1H is a diagram of a method of limiting the maximum number of carriers for each UE in MR-DC proposed in the disclosure, as a second embodiment of the disclosure.

As described above, filtering information associated with the maximum number of CCs in an NR SA mode is indicatable only for each band in a BC. In other words, only the number of CCs configuring a specific band may be limited, and it is not possible to limit the entire maximum number of CCs supported by the UE. In the first embodiment, the parameter for limiting the maximum number of carriers for each UE is added, as the filtering information, to the UECapabilityEnquiry message requesting the UE for the UE capability by the base station in the NR SA, and thus the total of CCs regarding BC and CA that the UE is to report may not exceed the requested maximum number of CCs for each UE. Also, as described in FIG. 1E, the maximum number of CCs of all UEs may be limited in the LTE SA system, and the number of CCs of all UEs may be limited via requestedMaxCCsDL-r13/requestedMaxCCsUL-r13. In other words, upon receiving the corresponding filtering information, the UE may report only a case in which the number of bands/CCs does not exceed an indicated value in a supported LTE band combination. However, for the NR SA and the LTE SA, the UE may limit the number of all carriers and report the same only when the UE operates independently for each RAT type. However, when the UE operates for MR-DC (NE-DC, NR-DC, EN-DC) as well as EN-DC, there is no procedure for the UE to limit and report the number of all carriers. Filtering fields in the LTE SA, i.e., requestedMaxCCsDL requestedMaxCCsUL, and filtering fields in the NR SA proposed in the first embodiment, i.e., maxCarriersRequestedDL maxCarriersRequestedUL, are not included in an MR-DC UE capability enquiry container, and thus are unable to be applied immediately. In the second embodiment, a method of enabling filtering independently applied to LTE SA or NR SA to be applied to MR-DC, or introducing separate filtering only for MR-DC is proposed. MR-DC UE capability may be generated considering filtering information included in MR-DC and NR containers below (see details of the standard below).

requestedFreqBandsNR-MRDC, requestedCapabilityNR (if present) and requestedCapabilityCommon if included);

Following options are possible as filtering for limiting the number of carriers dedicated to MR-DC, which is applied to the second embodiment.

1. Option 1: Support MR-DC Via Existing Signaling (No Additional Signaling)

Defined such that filtering for limiting the maximum number of CCs for each RAT (LTE and NR) is introduced and a corresponding parameter is applied to both SA and MR-DC.

In other words, it is possible to configure the maximum number of MR-DC parameters by a sum of parameters defined in each LTE SA and NR SA.

It is required to be defined such that the filtering defined in LTE/NR is also applicable to MR-DC.

2. Option 2: Introduce a Parameter or Limiting the Maximum Number of CCs Explicitly for MR-DC A separate parameter for SA and MR-DC is configured for each RAT (LTE and NR).

Two pieces of request information are included in filtering for each of LTE and NR (the maximum number of CCs for MR-DC and the maximum number of CCs for SA).

3. Option 3: Introduce a Parameter for Limiting the Maximum Number of CCs Explicitly for MR-DC Introduce, to UE-CapabilityRequestFilterCommon, a parameter for limiting the maximum number of CCs irrelevant to an RAT type.

It is required to maintain and set consistency with already-existing LIE and NR parameters (UE capability report).

For example, when 6 is indicated for MR-DC filtering for a limitation on the maximum number of CCs, 4 is indicated for NR filtering, and 4 is indicated for LTE filtering, The UE reports UE capability configured of up to 4 CCs regarding LTE SA The UE reports UE capability configured of up to 4 CCs regarding NR SA The UE reports UE capability configured of up to 6 CCs for MR-DC by adding NR and LTE CCs, but CCs included in each RAT does not exceed maximum of 4.

Example of Change in RRC ASN.1

```
UE-CapabilityRequestFilterCommon ::=    SEQUENCE {
    mrdc-Request                        SEQUENCE {
        omitEN-DC                           ENUMERATED {true}
OPTIONAL,         -- Need N
        includeNR-DC                        ENUMERATED {true}
OPTIONAL,         -- Need N
        includeNE-DC                        ENUMERATED {true}
OPTIONAL,         -- Need N
    }
OPTIONAL,         -- Need N
    ... ,
[ [ maxCarriersRequestedDL-MRDC     INTEGER (1..maxNrofServingCells)    OPTIONAL, --
Need N
    maxCarriersRequestedUL-MRDC     INTEGER (1..maxNrofServingCells)    OPTIONAL -
- Need N
] ]
}
```

2> if the ue-CapabilityRequest includes eutra-nr and if the UE supports (NG)EN-DC or NE-DC:

3> include the UE radio access capabilities for EUTRA-NR within a ue-CapabilityRAT-Container, with the rat-Type set to eutra-nr;

3> include hand combinations as specified in TS 38.331 [82], clause 5.6.1.4, considering the included In operation 1h-05, the UE in an RRC-connected state may receive, from the base station, a UE capability enquiry message requesting a UE capability report. The UE capability enquiry message may include a UE capability enquiry for each RAT type of the base station. The enquiry for each RAT type may include frequency band information and filtering information. The filtering information may be configured to be dependent on the RAT type (for example, filtering regarding the NR SA mode), and transmitted to be commonly applied to all RATs (for example, common filtering regarding MR-DC). Also, the UE capability enquiry message may enquire a plurality of RAT types via one RRC message container, or the UE capability enquiry message including an enquiry for each RAT type may be transmitted to the UE a plurality of times. The UE capability enquiry may be repeated a plurality of times, and the UE may configure a corresponding UE capability information message, match a response to the enquiry, and report the same. In a wireless communication system according to the disclosure, UE capability enquiry may be performed for MR-DC as well as NR, LTE, and EN-DC. For reference, the UE capability enquiry message is generally transmitted initially after the UE is connected, but may be enquired in any condition when required by the base station. Upon receiving the UE capability report request from the base station in operation 1$h$-05, the UE may identify a UE capability configuration to be reported according to band information and RAT type requested by the base station, in operation 1$h$-10.

When the RAT type requested by the base station is MR-DC (the RAT type is marked as "eutra-nr") in operation 1$h$-15, the UE may apply filtering information (UE-CapabilityRequestFilterNR) in NR SA, received filtering information (capabilityRequestFilterCommon) regarding MR-DC, and FreqBandList included in each RAT type of the UE capability enquiry message requested by the base station, in operation 1$h$-20. Alternatively, filtering information of an LTE part of the UE capability enquiry message transmitted from an LTE container may also be applied. The filtering information may include at least one of frequency information to be reported, an SRS switching time request, and the maximum number of carriers. In operation 1$h$-20, a filtering option for limiting the number of carriers dedicated to MR-DC applied to the second embodiment described above may be applied. In other words, a request for limiting the number of carriers of all UEs in MR-DC may be performed according to a corresponding option from among the above options, depending on how filtering information is determined.

In operation 1$h$-25, the UE may generate a candidate band combination by using the filtering applied in operation 1$h$-20, and generate supportedBandCombinationList, featureSetCombinations, and featureSets dedicated to RAT. For reference, operation 1$h$-25 may be performed in an NR container, and featureSets may not be generated in the MR-DC container. This is because featureSet for MR-DC is generated in NR and LTE containers. The generated information may be set to the corresponding RAT type and included in a UE capability container. In operation 1$h$-30, the UE may identify whether there is an RAT type remaining without being processed yet, and when there is the remaining RAT type, return to operation 1$h$-10 and repeat the procedure for each RAT type. However, when there is no RAT type remaining without being processed and the UE capability procedure has been performed for all RAT types, the UE may transmit, to the base station, UE capability information included in the UE capability container for each RAT type, in operation 1$h$-35.

When the RAT type received by the UE is not MR-DC in operation 1$h$-15 (when RAT type is "eutra" or "nr"), the UE may generate candidate band combinations by applying the received filtering information and the FreqBandList included in the RAT type of the UE capability enquiry message requested by the base station, in operation 1$h$-40.

Here, all candidate band combinations supporting NR SA and MR-DC may be selected. In operation 1$h$-45, the UE may perform a filtering operation on a corresponding RAT type from among the candidate band combinations generated (or generated and stored) in operation 1$h$-40, generate a band combination supported by the corresponding RAT type, feature sets, and feature set combinations, set generated UE capability information in the corresponding RAT type, and include the same in the UE capability container. Also, in operation 1$h$-50, the UE may identify whether there is an RAT type remaining without being processed yet, and when there is the remaining RAT type, return to operation 1$h$-10 and repeat the procedure for each RAT type. However, when there is no RAT type remaining without being processed and the UE capability procedure has been performed for all RAT types, the UE may transmit, to the base station, the UE capability information included in the UE capability container for each RAT type, in operation 1$h$-55.

Figure 1I:
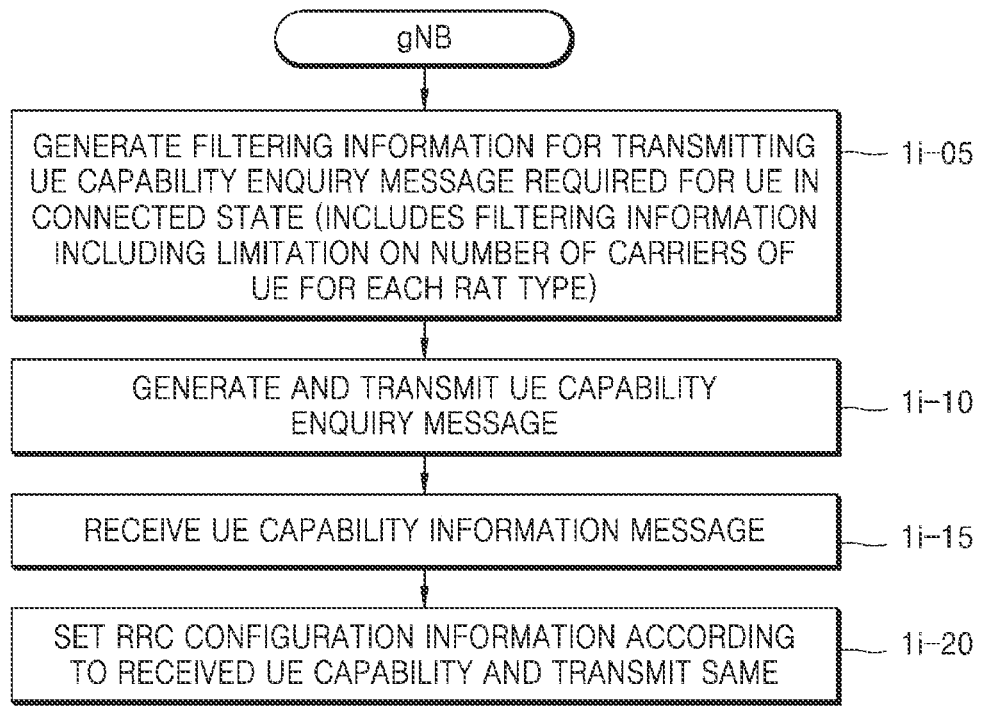
FIG. 1I is a diagram of operations of a base station regarding a method of limiting the maximum number of carriers for each UE, to which an embodiment of the disclosure is applied.

FIG. 1I is a diagram of operations of a gNB regarding a method of limiting the maximum number of carriers for each UE, to which an embodiment of the disclosure is applied.

In operation 1$i$-05, when the gNB does not include UE capability regarding a UE in a connected state, the gNB performs an advance procedure for requesting the UE for the UE capability. In other words, filtering information regarding which capability is to be received from the UE is set and generated, and the filtering may include an RAT type, frequency information, the maximum number of carriers, SRS switching, and the maximum number of MIMO layers. Accordingly, unnecessary UE capability may be prevented from being received from the UE, and thus signaling overhead may be reduced, and a processing load for processing the UE capability after receiving the UE capability is also reduced. In operation 1$i$-10, the gNB may generate a UE capability enquiry message by including the generated filtering information, and transmit the UE capability enquiry message to the UE. As a method by which the gNB transmits an RRC message, all pieces of filtering information may be included in one message and transmitted, or an RRC message may be separately generated for each RAT type and transmitted. In operation 1$i$-15, the gNB may receive, from the UE, a UE capability information message (UECapabilityInformation) in response to the UE capability enquiry message. In the message, corresponding UE capability is generated based on the filtering information requested by the gNB. Then, in operation 1$i$-20, the gNB may generate RRC configuration information for data transmission/reception and transmit the same to the UE, based on the received UE capability.

Figure 1J:
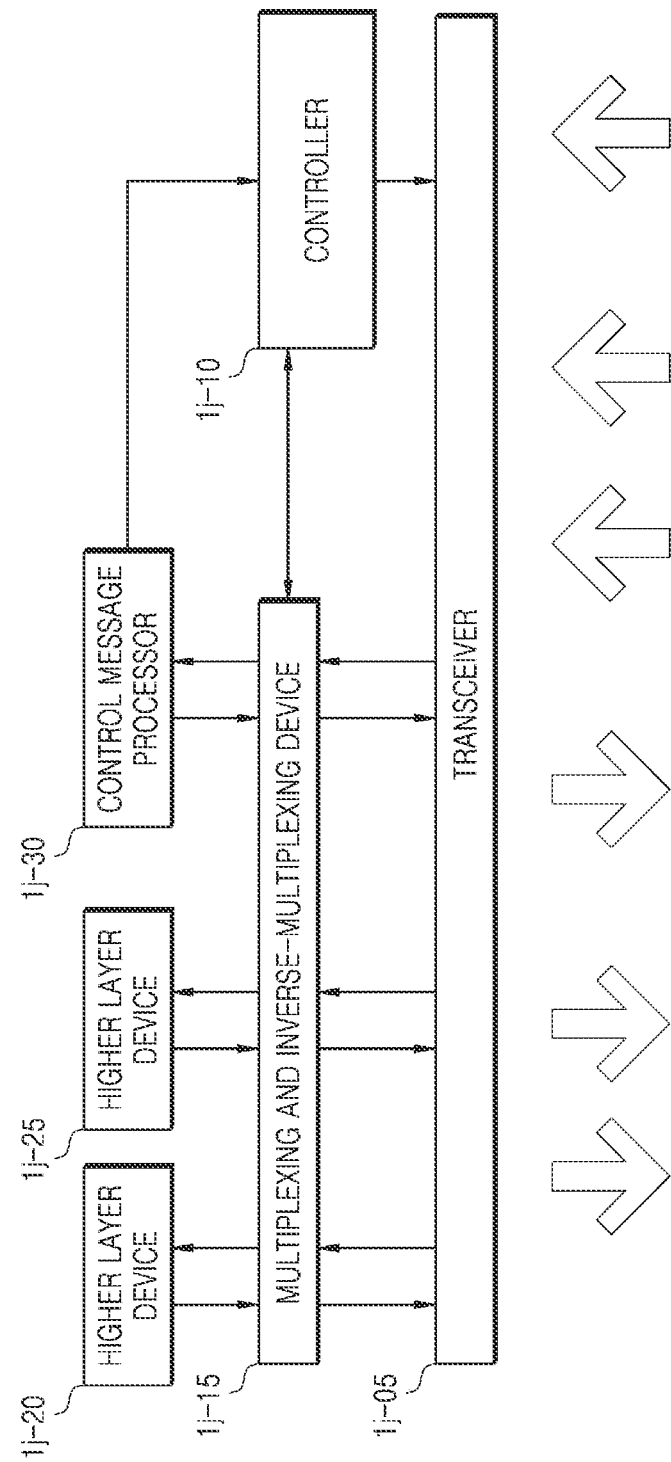
FIG. 1J is a block diagram of a configuration of a UE, according to an embodiment of the disclosure.

FIG. 1J is a block diagram of a configuration of a UE, according to an embodiment of the disclosure.

As shown in FIG. 1J, the UE according to an embodiment of the disclosure may include a transceiver 1$j$-05, a controller 1$j$-10, a multiplexing and inverse-multiplexing unit 1$j$-15, various higher layer processors 1$j$-20 and 1$j$-25, and a control message processor 1$j$-30.

The transceiver 1$j$-05 may receive data and a certain control signal in a forward channel of a serving cell, and transmit data and a certain control signal in an inverse channel. When a plurality of serving cells are configured, the transceiver 1$j$-05 may perform data transmission/reception and control signal transmission/reception via the plurality of serving cells. The multiplexing and inverse-multiplexing unit 1$j$-15 may multiplex data generated in the higher layer processors 1$j$-20 and 1$j$-25 or control message processor 1$j$-30, or inverse-multiplex data received from the transceiver 1$j$-05 to transmit the data to the suitable higher layer processors 1*j*-20 and 1*j*-25 or control message processor 1*j*-30. The control message processor 1*j*-30 performs a necessary operation by transmitting/receiving a control message to/from a base station. For example, the control message processor 1*j*-30 may process a control message, such as an RRC message or MAC CE, and perform a CBR measurement value report, and reception of an RRC message regarding a resource pool and a UE operation. The higher layer processors 1*j*-20 and 1*j*-25 denote DRB devices and may be configured for each service. Data generated in a user service, such as a file transfer protocol (FTP) or a voice over Internet protocol (VoIP), is processed and transmitted to the multiplexing and inverse-multiplexing unit 1*j*-15, or data transmitted from the multiplexing and inverse-multiplexing unit 1*j*-15 is processed and transmitted to a service application of a higher layer. The controller 1*j*-10 may control the transceiver 1*j*-05 and the multiplexing and inverse-multiplexing unit 1*j*-15 such that inverse transmission is performed with suitable transmission resources at a suitable time point, by identifying a scheduling command received via the transceiver 1*j*-05, for example, inverse grants. The UE has been described as including a plurality of blocks, wherein the blocks perform different functions, but this is only an embodiment and is not limited thereto. For example, functions performed by the inverse-multiplexing unit 1*j*-15 may be performed by the controller 1*j*-10.

Figure 1K:
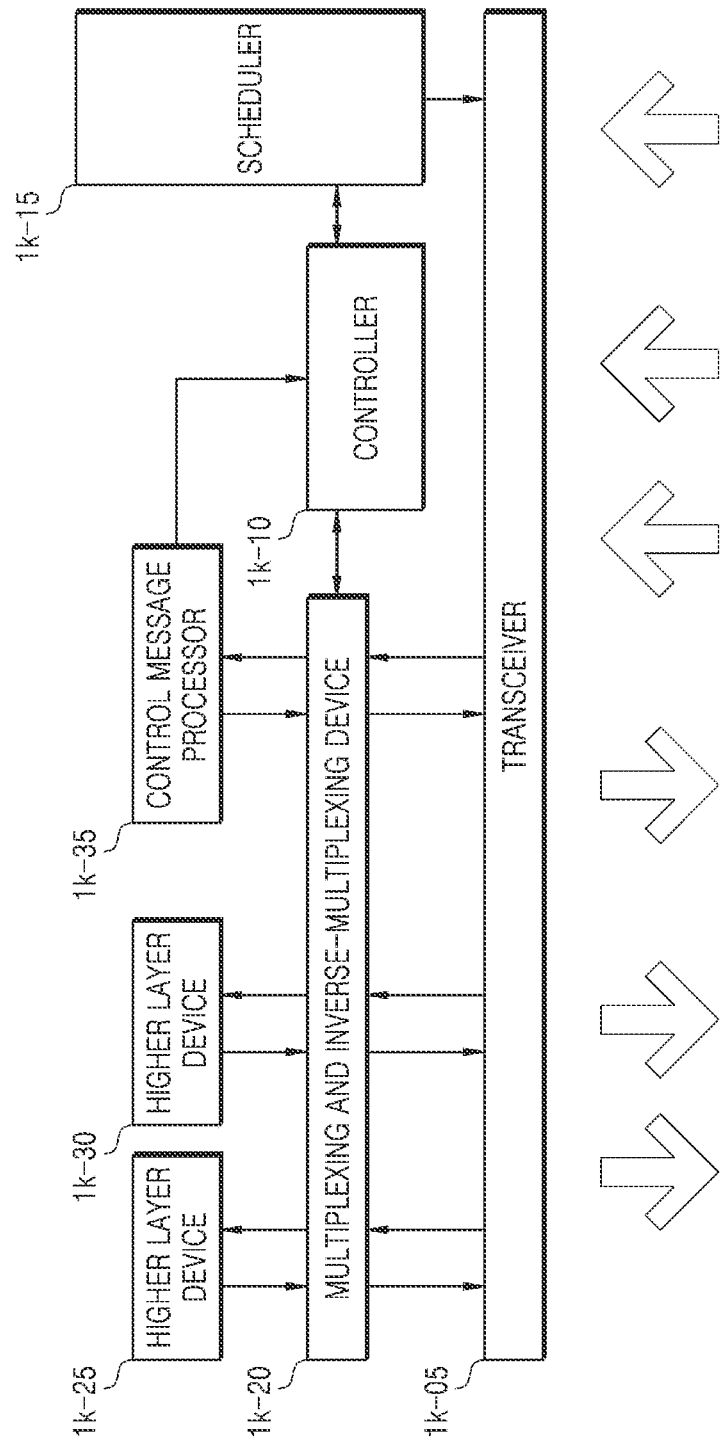
FIG. 1K is a block diagram of a configuration of a base station, according to an embodiment of the disclosure.

FIG. 1K is a block diagram of a configuration of a base station, according to an embodiment of the disclosure.

The base station of FIG. 1K may include a transceiver 1*k*-05, a controller 1*k*-10, a multiplexing and inverse-multiplexing unit 1*k*-20, a control message processor 1*k*-35, various higher layer processors 1*k*-25 and 1*k*-30, and a scheduler 1*k*-15.

The transceiver 1*k*-05 may transmit data and a certain control signal in a forward carrier, and receive data and a certain control signal in an inverse carrier. When a plurality of carriers are configured, the transceiver 1*k*-05 may perform data transmission/reception and control signal transmission/reception via the plurality of carriers. The multiplexing and inverse-multiplexing unit 1*k*-15 may multiplex data generated in the higher layer processors 1*k*-25 and 1*k*-30 or control message processor 1*k*-35, or inverse-multiplex data received from the transceiver 1*k*-05 to transmit the data to the suitable higher layer processors 1*k*-25 and 1*k*-30, the control message processor 1*k*-35, or the controller 1*k*-10. The control message processor 1*k*-35 may generate a message to be transmitted to a UE and transmit the message to a lower layer, based on control by the controller. The higher layer processors 1*k*-25 and 1*k*-30 may be configured for each service of each UE, and process data generated in a user service, such as FTP or VoIP, and transmit the same to the multiplexing and inverse-multiplexing unit 1*k*-20, or process data transmitted from the multiplexing and inverse-multiplexing unit 1*k*-20 and transmit the same to a service application of a higher layer. The scheduler 1*k*-15 may assign a transmission resource to the UE in consideration of a buffer status, channel status, and active time of the UE, and processes a signal transmitted by the UE to the transceiver or perform a signal transmission process regarding the UE.

In a wireless communication system according to an embodiment, upon receiving a capability report request from a base station, a UE may perform filtering on a candidate BC for each RAT type, determine a BC corresponding to a requested RAT type from a final candidate BC list generated as a result of the filtering, and transmit capability information regarding the determined BC to the base station. According to an embodiment of the disclosure, a method performed by a UE in a wireless communication system may include; receiving, from a base station, a UE capability enquiry message associated with a limitation on the maximum number of transmission CCs of the UE; when an RAT type of the received UE capability enquiry message indicates MR-DC and the UE supports the MR-DC, determining UE capability information that the UE is to report, based on the received UE capability enquiry message; and transmitting the determined UE capability information to the base station.

According to an embodiment, the UE capability enquiry message may include: a parameter regarding a first maximum number of transmission CCs for a limitation on UE capability information associated with SA of a first communication system; and a parameter regarding a second maximum number of transmission CCs for a limitation on UE capability information associated with SA of a second communication system.

According to an embodiment, the determining of the UE capability information may include: determining a third maximum number of transmission CCs for a limitation on UE capability information associated with the MR-DC, based on a sum of the first maximum number of transmission CCs and the second maximum number of transmission CCs; and limiting the UE capability information, based on the determined third maximum number of transmission CCs.

According to an embodiment, the UE capability enquiry message may further include: a parameter regarding a fourth maximum number of transmission CCs for a limitation on UE capability information associated with MR-DC of the first communication system; and a parameter regarding a fifth maximum number of transmission CCs for a limitation on UE capability information associated with MR-DC of the second communication system.

According to an embodiment, the determining of the UE capability information may include: determining a sixth maximum number of transmission CCs for a limitation on the UE capability information associated with the MR-DC, based on a sum of the fourth maximum number of transmission CCs and the fifth maximum number of transmission CCs; and limiting the UE capability information, based on the determined sixth maximum number of transmission CCs.

According to an embodiment, the UE capability enquiry message may further include a parameter regarding a seventh maximum number of transmission CCs for a limitation on UE capability information associated with the MR-DC, and the determining of the UE capability information may include limiting the UE capability information, based on the seventh maximum number of transmission CCs.

According to an embodiment, the limited UE capability information may include information about at least one band combination in which the number of transmission CCs is equal to or less than the seventh maximum number of transmission CCs, and the at least one band combination may include a first band combination associated with the first communication system and a second band combination associated with the second communication system. According to an embodiment, the number of transmission CCs corresponding to the first band combination may be equal to or less than the first maximum number of transmission CCs, and the number of transmission CCs corresponding to the second band combination may be equal or less than the second maximum number of transmission CCs.

According to an embodiment, the first communication system and the second communication system respectively include an LTE system and an NR system.

According to an embodiment of the disclosure, a UE in a wireless communication system includes: a transceiver; and at least one processor configured to: receive a UE capability enquiry message associated with a limitation on the maximum number of transmission CCs of the UE from a base station through the transceiver; when an RAT type of the received UE capability enquiry message indicates MR-DC, and the UE supports the MR-DC, determine UE capability information that the UE is to report, based on the received UE capability enquiry message; and transmit the determined UE capability information to the base station through the transceiver.

According to an embodiment, the UE capability enquiry message may include: a parameter regarding a first maximum number of transmission CCs for a limitation on UE capability information associated with SA of a first communication system; and a parameter regarding a second maximum number of transmission CCs for a limitation on UE capability information associated with SA of a second communication system.

According to an embodiment, the at least one processor may be further configured to: determine a third maximum number of transmission CCs for a limitation on UE capability information associated with the MR-DC, based on a sum of the first maximum number of transmission CCs and the second maximum number of transmission CCs; and limit the UE capability information, based on the determined third maximum number of transmission CCs.

According to an embodiment, the UE capability enquiry message may further include: a parameter regarding a fourth maximum number of transmission CCs for a limitation on UE capability information associated with MR-DC of the first communication system; and a parameter regarding a fifth maximum number of transmission CCs for a limitation on UE capability information associated with MR-DC of the second communication system.

According to an embodiment, the at least one processor may be further configured to: determine a sixth maximum number of transmission CCs for a limitation on the UE capability information associated with the MR-DC, based on a sum of the fourth maximum number of transmission CCs and the fifth maximum number of transmission CCs; and limit the UE capability information, based on the determined sixth maximum number of transmission CCs.

According to an embodiment, the UE capability enquiry message may further include a parameter regarding a seventh maximum number of transmission CCs for a limitation on UE capability information associated with the MR-DC, and the at least one processor may be further configured to limit the UE capability information, based on the seventh maximum number of transmission CCs.

In specific embodiments of the disclosure described above, elements included in the disclosure are expressed in a singular or plural form according to the specific embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

The invention claimed is:

1. A method performed by a user equipment (UE) in a wireless communication system, the method comprising:
   receiving, from a base station, a UE capability request message for a multi-radio dual connectivity (MR-DC);
   based on the UE capability request message, determining a maximum number of transmission component carriers (CCs) supported by the UE in the MR-DC;
   based on the maximum number of transmission CCs, determining UE capability information; and
   transmitting the UE capability information to the base station,
      wherein the UE capability information includes information associated with at least one band combination,
      wherein a number of transmission CCs related to the at least one band combination is less than or equal to the maximum number of transmission CCs, and
      wherein the at least one band combination includes a first band combination associated with a first radio access technology (RAT) and a second band combination associated with a second RAT.

2. The method of claim 1,
   wherein the UE capability request message includes information indicating a maximum number of transmission CCs per RAT, and
   wherein the information indicating the maximum number of transmission CCs per RAT is applied to both of a stand-alone (SA) and the MR-DC.

3. The method of claim 2,
   wherein the maximum number of transmission CCs supported by the UE in the MR-DC is determined based on a sum of a maximum number of transmission CCs for the first RAT and a maximum number of transmission CCs for the second RAT.

4. The method of claim 1,
   wherein the UE capability request message includes information indicating a maximum number of transmission CCs for a stand-alone (SA) and information indicating a maximum number of transmission CCs for the MR-DC, per RAT.

5. The method of claim 4,
   wherein the maximum number of transmission CCs supported by the UE in the MR-DC is determined based on the maximum number of transmission CCs for the MR-DC indicated per RAT.

6. The method of claim 1,
   wherein the UE capability request message includes information indicating a maximum number of transmission CCs applied commonly to all types of RATs, and
   wherein the maximum number of transmission CCs supported by the UE in the MR-DC is determined based on the maximum number of transmission CCs applied commonly to all types of RATs.

7. The method of claim 1,
   wherein a number of transmission CCs corresponding to the first band combination is less than or equal to a maximum number of transmission CCs for the first RAT, and
   wherein a number of transmission CCs corresponding to the second band combination is less than or equal to a maximum number of transmission CCs for the second RAT.

8. The method of claim 2,
   wherein the RAT includes a long-term evolution (LTE) system or a new radio (NR) system.

9. A user equipment (UE) in a wireless communication system, the UE comprising:
- a transceiver; and
- at least one processor coupled with the transceiver and configured to:
- receive, from a base station, a UE capability request message for a multi-radio dual connectivity (MR-DC);
- based on the UE capability request message, determine a maximum number of transmission component carriers (CCs) supported by the UE in the MR-DC;
- based on the maximum number of transmission CCs, determine UE capability information; and
- transmit the UE capability information to the base station,
  - wherein the UE capability information includes information associated with at least one band combination,
  - wherein a number of transmission CCs related to the at least one band combination is less than or equal to the maximum number of transmission CCs, and
  - wherein the at least one band combination includes a first band combination associated with a first radio access technology (RAT) and a second band combination associated with a second RAT.

10. The UE of claim 9,
- wherein the UE capability request message includes information indicating a maximum number of transmission CCs per RAT, and
- wherein the information indicating the maximum number of transmission CCs per RAT is applied to both of a stand-alone (SA) and the MR-DC.

11. The UE of claim 10,
- wherein the maximum number of transmission CCs supported by the UE in the MR-DC is determined based on a sum of a maximum number of transmission CCs for the first RAT and a maximum number of transmission CCs for the second RAT.

12. The UE of claim 9,
- wherein the UE capability request message includes information indicating a maximum number of transmission CCs for a stand-alone (SA) and information indicating a maximum number of transmission CCs for the MR-DC, per RAT.

13. The UE of claim 12,
- wherein the maximum number of transmission CCs supported by the UE in the MR-DC is determined based on the maximum number of transmission CCs for the MC-DC indicated per RAT.

14. The UE of claim 9,
- wherein the UE capability request message includes information indicating a maximum number of transmission CCs applied commonly to all types of RATs, and
- wherein the maximum number of transmission CCs supported by the UE in the MR-DC is determined based on the maximum number of transmission CCs applied commonly to all types of RATs.

* * * * *